J. M. ROSSELOT.
WAY SIGNAL.
APPLICATION FILED JAN. 20, 1914.
1,134,909. Patented Apr. 6, 1915.
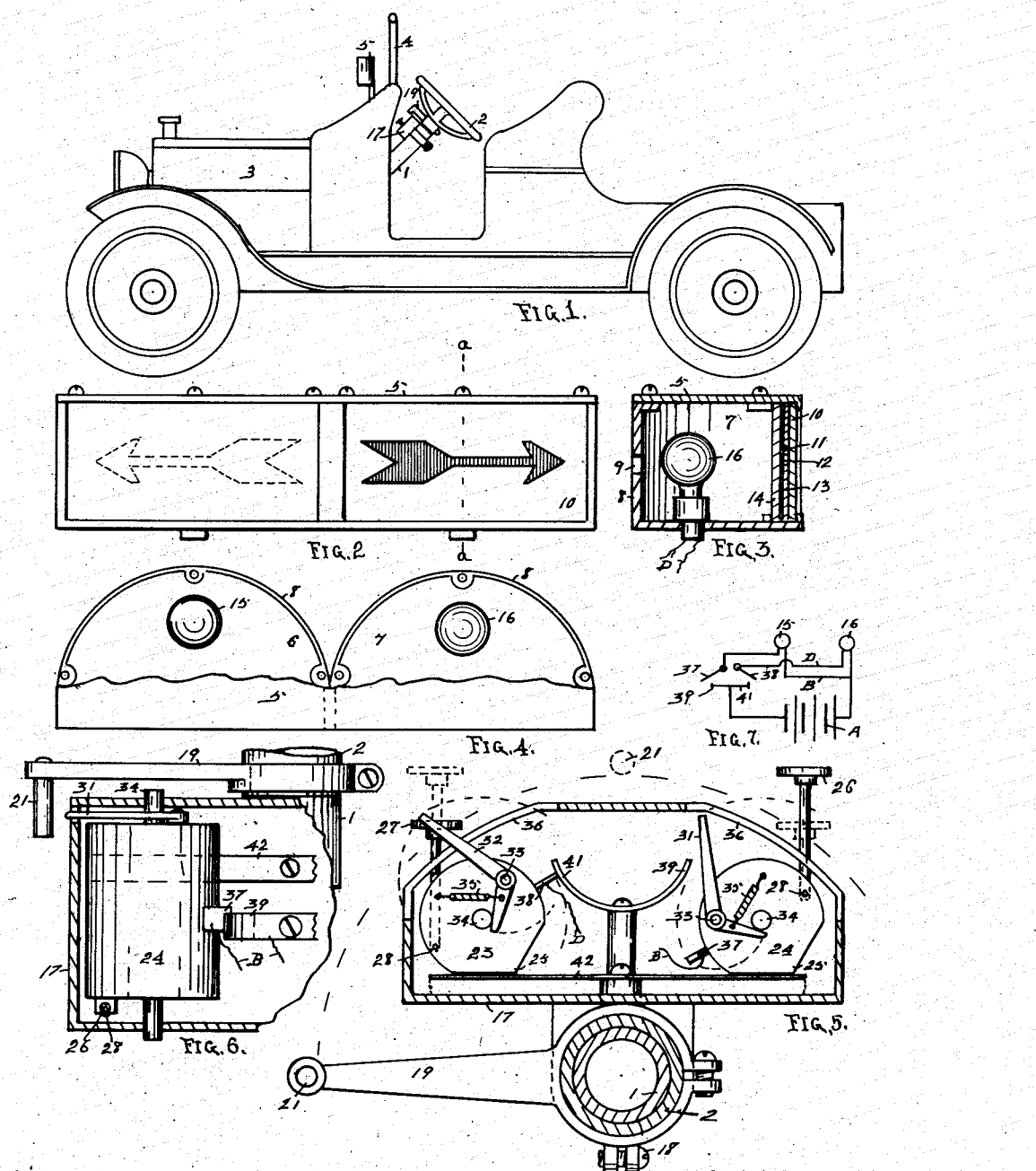

UNITED STATES PATENT OFFICE.

JOSEPH M. ROSSELOT, OF CINCINNATI, OHIO, ASSIGNOR OF ONE-HALF TO B. B. QUILLEN, OF CINCINNATI, OHIO.

WAY-SIGNAL.

1,134,909.   Specification of Letters Patent.   Patented Apr. 6, 1915.

Application filed January 20, 1914. Serial No. 813,174.

*To all whom it may concern:*

Be it known that I, JOSEPH M. ROSSELOT, a citizen of the United States, residing at Cincinnati, Ohio, have invented a new and useful Improvement in Way-Signals, of which the following is a specification.

My invention relates to way signals of the class adapted to the use of motor vehicles or for other suitable purposes, and the objects of my improvements are to provide means for indicating in approaching a crossing which direction the driver intends to turn the vehicle; to provide for electrically operating the direction signals; to provide means for automatically discontinuing the signal light when resuming a straight course after the turn has been made; to attach the switch mechanism for controlling the light circuit to the steering post where it is easily accessible to the driver, and to provide simple and durable construction and assemblage of the various parts for securing facility of operation and efficiency of action.

These objects may be attained in the following described manner as illustrated in the accompanying drawings, in which:

Figure 1 is a side elevation of a motor car provided with my improvement; Fig. 2, a front elevation of the signal box; Fig. 3 a vertical section on the line $a$—$a$ of Fig. 2; Fig. 4, a plan of the signal box with portions of the cover broken away; Fig. 5, a plan with parts in section of the switch box and operating mechanism therein; Fig. 6 a rear elevation thereof with portions removed and parts in section, and Fig. 7 a diagram of the electric circuits.

In the drawings, 1 represents the steering post of a motor vehicle, 2 the steering wheel, 3 the hood, and 4 the wind shield, all being constructed and arranged in the ordinary manner. The signal box 5 may be secured in any conspicuous position on the front portion of the vehicle or car. Said box is preferably formed of metal and with compartments 6 and 7 each having a semi-circular rear wall 8 with an opening 9 therein and with a transparent front wall 10 preferably of ground glass. A sheet of metal 11 formed with signal openings 12 contacts with the inside of the glass 10 and a translucid film 13 preferably colored red, is maintained in contact with the inner side of the metal sheet 11 by means of a glass plate 14. Electric lamps 15 and 16 secured within the respective compartments serve to display the corresponding signal through the front of the box, as shown in Fig. 2. The switch box 17 may be secured on the steering post of the vehicle adjacent to the steering wheel by means of a clamping screw 18, and an arm 19 provided with a projecting pin 21 may be adjustably secured on the hub of the steering wheel 2 as shown in Figs. 5 and 6. Cylinders 23 and 24 each formed with an angle 25 on one side and journaled in the switch box may be turned in an outward direction by means of the respective push buttons 26 and 27 which are pivotally connected to the crank pins 28 on the front end of the cylinders.

Similar levers 31 and 32 pivotally connected to the corresponding crank pins 33 on the rear end of the cylinders are maintained under a yielding pressure with one end in contact with the corresponding journal 34 by means of springs 35. The opposite end portion of said levers is movable through corresponding slots 36 formed through the top wall of the switch box. Contact points 37 and 38 secured on the respective cylinders may be turned therewith into and out of contact with the respective switch points 39 and 41 which are secured within the said box and between the cylinders therein. A battery A communicates through circuit B and the switch points 37 and 39 with the lamp 15 and through circuit D and the switch points 38 and 41 with the lamp 16 as shown in Fig. 7. A spring 42 serves to maintain the cylinders under a yielding pressure in predetermined rotative positions with the corresponding circuits either open or closed as shown in Fig. 5.

In operation, in approaching a crossing the driver of the vehicle may display to the pedestrians or to an approaching vehicle, the direction either right or left he intends to turn by simply depressing the corresponding push botton 26 or 27. If to the left the button 27 turns cylinder 23 with the switch points 38 and 41 into contact for closing the circuit D and igniting the lamp 16 to illuminate the arrow pointing toward the left. The curved rear wall of the signal box serves to diffuse the light to show the signal more evenly through the film covered opening in the front wall of the box as shown by the arrow in Fig. 2. The turning of the cylinder 23 by means of the button 27 carries the lever 32 in an upward and outward direction through the corresponding slot 36 and in the path of the pin 21 on arm 19. Said arm should be adjusted on the steering wheel with the pin 21 directly over the center line of the switch box as shown in dotted lines in Fig. 5, when the vehicle is being driven in a straight course. In making the turn to the left as shown by the illuminated signal, the yielding of the corresponding spring 35 will permit the pin 21 to depress the lever 32 out of its path without turning the cylinder. After the turn is made the movement of the steering wheel for returning the vehicle to the straight course carries the arm with the pin 21 into contact with and moves the lever with the cylinder into a similar position to that of the opposite cylinder 24, shown in Fig. 5 whereby the circuit D is broken and lamp 16 put out. In a similar manner by depressing the button 26 the lamp 15 may be ignited to illuminate the signal for turning to the right as shown by dotted lines in Fig. 2. In resuming the straight course after making the turn, the pin 21 engages with and moves the lever 31 with the cylinder 24 to the position shown in Fig. 5 whereby the circuit B is broken and the lamp 15 put out.

Having fully described my improvements, what I claim as my invention and desire to secure by Letters Patent of the United States is:

1. A way signal for motor vehicles comprising a switch box mounted on the steering post, a rotatively adjustable cylinder therein, a push button for turning the cylinder to close the circuit, a lever for turning the cylinder in the opposite direction for opening the circuit, and an arm movable with the steering wheel for automatically actuating the lever.

2. A way signal for motor vehicles comprising a signal lamp, a switch box for controlling the electric circuit thereto, a push button for operating the switch within the box to close the circuit, a lever for actuating the switch to open the circuit and movable by the button to project beyond the cover of the box, and an arm secured on the steering wheel and movable thereby to automatically actuate the lever in one direction.

3. In a motor vehicle, the combination of a signal lamp mounted thereon, an arm adjustably secured on the steering wheel, a switch box mounted at a fixed point, and a lever projected therefrom in the path of the arm when the switch in the box is operated to close the circuit.

4. In a motor vehicle, the combination of a battery, a lamp in circuit therewith, an arm adjustably secured on the steering wheel, a switch lever movable into the path of the arm with the closing of the circuit, yielding connections with the lever to permit the passage of the arm thereover in one direction, and a stop for engaging the lever with the arm in its movement in the other direction for automatically opening the circuit.

J. M. ROSSELOT.

Witnesses:
EDWARD C. LOVETT,
R. S. CARR.